(12) United States Patent
Larsen et al.

(10) Patent No.: US 7,963,740 B2
(45) Date of Patent: Jun. 21, 2011

(54) WIND ENERGY CONVERTER, A WIND TURBINE FOUNDATION, A METHOD AND USE OF A WIND TURBINE FOUNDATION

(75) Inventors: Gerner Larsen, Hinnerup (DK); Niels Martin Henriksen, Beder (DK); Jan Bjerre Christensen, Hinnerup (DK); Søren P. Jensen, Varde (DK)

(73) Assignee: Vestas Wind Systems A/S (DK)

( * ) Notice: Subject to any disclaimer, the term of this patent is extended or adjusted under 35 U.S.C. 154(b) by 0 days.

(21) Appl. No.: 12/435,049

(22) Filed: May 4, 2009

(65) Prior Publication Data
US 2009/0212575 A1    Aug. 27, 2009

Related U.S. Application Data

(63) Continuation of application No. PCT/DK2007/000471, filed on Nov. 2, 2007.

(30) Foreign Application Priority Data

Nov. 3, 2006  (DK) ................................. 2006 01430

(51) Int. Cl.
*F03D 11/00* (2006.01)
(52) U.S. Cl. ............... 415/4.3; 415/114; 416/DIG. 6
(58) Field of Classification Search .............. 415/4.3, 415/114, 175, 177, 180, 908; 416/DIG. 6
See application file for complete search history.

(56) References Cited

U.S. PATENT DOCUMENTS

| | | | |
|---|---|---|---|
| 2,181,953 A | | 12/1939 | Usselman |
| 4,565,929 A | * | 1/1986 | Baskin et al. ............... 290/44 |
| 6,520,737 B1 | * | 2/2003 | Fischer et al. ............. 415/4.3 |
| 6,676,122 B1 | | 1/2004 | Wobben |
| 2008/0290662 A1 | * | 11/2008 | Matesanz Gil et al. ......... 290/44 |
| 2009/0094981 A1 | * | 4/2009 | Eggleston .................... 60/641.2 |
| 2009/0212560 A1 | * | 8/2009 | Larsen ............................. 290/2 |
| 2009/0289461 A1 | * | 11/2009 | Larsen ........................... 290/55 |

(Continued)

FOREIGN PATENT DOCUMENTS

DE        10330139 A1    1/2004

(Continued)

OTHER PUBLICATIONS

International Preliminary Report on Patentability and Written Opinion of the International Searching Authority; PCT/DK2007/000471; May 5, 2009; 6 pages.

(Continued)

*Primary Examiner* — Nathaniel Wiehe
(74) *Attorney, Agent, or Firm* — St. Onge Steward Johnston & Reens LLC

(57) ABSTRACT

A wind energy converter includes a wind turbine, a wind turbine foundation including a strengthening structure, and a temperature control mechanism for controlling the temperature of one or more areas of the wind turbine. The wind energy converter is characterized in that at least a part of the temperature control mechanism adjoins the strengthening structure. Also contemplated is a wind turbine foundation including a strengthening structure. The wind turbine foundation is characterized in that the foundation includes at least a part of a temperature control mechanism for heat exchanging with one or more areas of a wind turbine and in that at least a part of the temperature control mechanism adjoins the strengthening structure. Even further contemplated is a method for controlling the temperature of one or more areas of a wind turbine and use of a wind turbine foundation.

20 Claims, 9 Drawing Sheets

U.S. PATENT DOCUMENTS

2010/0008776 A1*  1/2010  Larsen et al. .................. 416/39
2010/0095617 A1*  4/2010  Scholte-Wassink ............ 52/296

FOREIGN PATENT DOCUMENTS

| | | |
|---|---|---|
| DE | 10352023 A1 | 6/2005 |
| DE | 102004061391 A1 | 7/2006 |
| JP | 2005009737 A | 1/2005 |
| JP | 2005069507 A | 3/2005 |
| JP | 2005188866 A | 7/2005 |
| WO | 9217664 A1 | 10/1992 |
| WO | 0068570 A1 | 11/2000 |
| WO | 0177526 A1 | 10/2001 |
| WO | 2007110718 A2 | 10/2007 |

OTHER PUBLICATIONS

Danish Search Report, Jun. 19, 2007 (8 pages.
International Search Report and Written Opinion of the International Searching Authority, Jul. 3, 2008 (10 pages).
Danish Search Report; Application No. PA 2006 01431; Jun. 19, 2007; 1 page.
International Search Report; PCT/DK2007/000472; Jun. 25, 2008; 3 pages.

\* cited by examiner

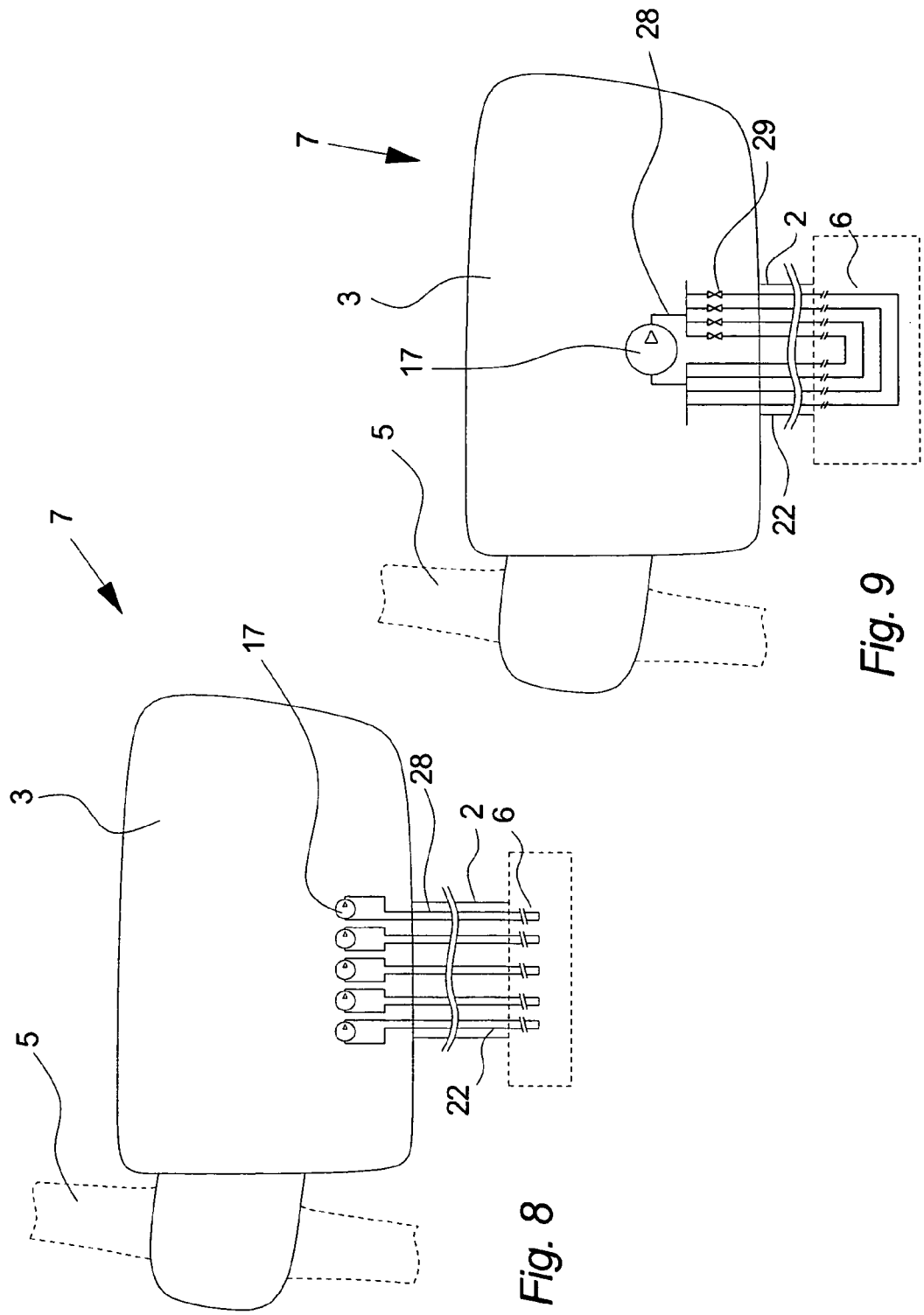

WIND ENERGY CONVERTER, A WIND TURBINE FOUNDATION, A METHOD AND USE OF A WIND TURBINE FOUNDATION

CROSS-REFERENCE TO RELATED APPLICATIONS

The present application is a continuation of pending International patent application PCT/DK2007/000471 filed on Nov. 2, 2007 which designates the United States and claims priority from Danish patent application PA 2006 01430 filed on Nov. 3, 2006, the content of which is incorporated herein by reference.

FIELD OF THE INVENTION

The invention relates to a wind energy converter comprising a wind turbine, a wind turbine foundation including a strengthening structure, and temperature control means for controlling the temperature of one or more areas of the wind turbine, wherein at least a part of the temperature control means adjoins the strengthening structure, and wherein the foundation comprises one or more fluid conduits of the temperature control means. Also contemplated is a method for controlling the temperature of one or more areas of a wind turbine and use of a wind turbine.

BACKGROUND OF THE INVENTION

A modern wind energy converter known in the art comprises a wind turbine placed on and rigidly connected to a wind turbine foundation. The wind turbine comprises a tower and a wind turbine nacelle positioned on top of the tower. A wind turbine rotor, comprising one or more wind turbine blades, is connected to the nacelle through a low speed shaft, which extends out of the nacelle front.

Controlling the temperature of electrical and mechanical components—particularly during operation of the components—has always been a problem and especially within the art of wind energy converters, this problem has been profound. Often the same wind energy converter type has to be able to operate in both extremely hot and extremely cold areas of the globe, which makes heavy demands on the wind energy converters system for controlling the temperature of especially wind turbine components such as gear, generator, power handling equipment, bearings and other.

Even though modern wind turbines often become more and more efficient in converting the rotation of the wind turbine rotor to power, the process will always result in some of the energy being converted to heat in some of the wind turbine components.

This excess heat must be removed from the components to protect the components and for them to function properly. Traditionally this has been done by means of one or more cooling systems, which by means of a cooling medium can transport the heat from the components to a radiator, which can give off the heat to the air outside the wind turbine and/or by creating an air flow of air from the outside of the wind turbine which passes the components.

But the quality of the outside air is difficult to control both in temperature, humidity, purity and other. Furthermore, modern wind turbines get bigger and bigger in power output and thereby often also in production of excess heat and this matched with the fact that air is a relatively poor conductor of heat, make these types of cooling systems very large, expensive and heavy.

Even further, the fact that the temperature of the air outside the wind turbine varies a lot from site to site, from day to night and from season to season—in extreme cases from −30° to +50° Celsius—in some cases will result in wind energy converters with an over-dimensioned and expensive cooling system. This problem could of course be overcome by adapting the temperature control system of the wind energy converter to the specific erection site, but this would be logistically difficult, expensive and prolong the time of delivery of the wind energy converters.

Another way of controlling the temperature of wind turbine components is disclosed in American patent No U.S. Pat. No. 6,676,122 B1, where the cooling system cools the components in the nacelle and the tower by circulating air inside the tower and the nacelle, making it give off heat through the surface of the tower and nacelle. But such a system is both complex and difficult to implement and since wind turbines usually produce the majority of the power during the day (because of more wind during the day), it usually also needs the most cooling during the day, where the sun and the ambient temperature will heat up the surface of the wind turbine. Such a system will therefore have to have a very large cooling capacity to be able to work properly, making the system itself very large and expensive.

Regarding offshore wind energy converters it is known to use seawater to cool different components of the wind turbine, but if the cooling system is open there are serious problems regarding ice, clogging, corrosion and other, which are difficult and expensive to solved, and if the system is closed e.g. by circulating the cooling medium through a hose placed in the seawater there is ice, storm, overgrowing and other to be solved. The problems of both these systems being complicated and expensive to overcome and no matter how it is done, this technique is only feasible in relation to offshore wind energy converters.

Another way of controlling the temperature in a wind turbine is disclosed in DE 10 2004 061 391 A1 where air is being drawn through cable canals in the wind turbine foundation to lower the temperature of the air before it is used to cool equipment in the tower of a wind turbine. But this cooling system is not very efficient and is contains several of the previously mentioned drawbacks such as difficulties in controlling the quality and other.

It is therefore an object of the invention to provide for a wind energy converter without the above mentioned disadvantages.

Especially it is an object of the invention to provide for an advantageous and cost-efficient technique for controlling the temperature of one or more areas of a wind energy converter, particularly regarding where and how to give off excess heat and/or absorb needed heat.

SUMMARY OF THE INVENTION

The invention provides for a wind energy converter comprising a wind turbine, a wind turbine foundation including a strengthening structure, and temperature control means for controlling the temperature of one or more areas of the wind turbine. The wind energy converter is characterized in that at least a part of the temperature control means adjoins the strengthening structure.

The temperature of the wind turbine foundation and the surrounding ground will vary within a relatively little range and at a certain depth the temperature is substantially constant all over the globe. It is therefore advantageous to integrate the temperature control means in the wind turbine foundation, it that this environment is more predictable and constant.

By adjoining at least a part of the temperature control means with the strengthening structure of the foundation it is possible to fixate the temperature control means inside the foundation so that the position of the part of the temperature control means being embedded in the foundation is substantially secured e.g. during the making of the foundation and/or during the entire life of the foundation.

The temperature control means will heat or cool the part of the foundation that it is in contact with the temperature control means and if the position of the temperature control means in the foundation is not controlled, the risk of possibly damaging strain in the foundation is increased due to thermal expansion.

Furthermore, the efficiency of the temperature control means is also increased if it is possible to distribute the heat dissipation or heat absorption over a larger area and it is therefore advantageous to enable that a desired position of the temperature control means can be substantially maintained.

In an aspect of the invention, said temperature control means comprising a cooling fluid for transporting heat to or from said one or more areas of said wind turbine, one or more pumps for creating a flow of said cooling fluid and one or more heat sinks for giving off heat from or supplying heat to said cooling fluid.

By creating a flow of cooling fluids to or form the areas of the wind turbine that needs heating or cooling is an efficient way of transporting heat in a temperature control system, particularly over large distances as in a wind energy converter.

It should be emphasised that by the term "heat sink" is to be understood any kind of structure or device that absorbs or dissipates heat.

In an aspect of the invention, at least a part of said foundation is a heat sink of said temperature control means.

The foundation has an enormous heat capacity and it is also a relatively good conductor of heat, making it very suitable as a heat sink of temperature control means of a wind energy converter.

Making the wind turbine foundation act as a heat sink of the temperature control means is advantageous, in that the foundation presents a very controlled environment, making it possible to dimension the temperature control system very exactly and ensuring that the heat sinks capacity is maintained throughout the entire life of the wind energy converter. Furthermore if the foundation is completely or partly prefabricated it is possible to integrated or install and test e.g. the fluid conduits in advance e.g. to ensure that the foundation provides the desired capacity.

In an aspect of the invention, said heat sink comprises means for dissipating the bulk of said areas excess heat to said foundation and/or said heat sink comprises means for absorbing the bulk of said areas needed heat from said foundation.

By dissipating or absorbing the main part of the heat in the wind turbine foundation, it is possible to make a more cost-efficient temperature control system, in that the capacity of the heat sink of the temperature control means thereby becomes more constant and predictable, no matter the location on the globe or the time of day or year.

In an aspect of the invention, said temperature control means comprise one or more fluid conduits for guiding a cooling fluid in and/or between said one or more areas of said wind turbine and said heat sink.

Using fluid conduits for guiding the cooling fluid in and/or between the areas of the wind turbine and the heat sink is advantageous, in that it provides for a simple and efficient way of moving the fluids.

In an aspect of the invention, said one or more fluid conduits are formed as one or more closed circuits making said cooling fluid circulate in said temperature control means.

It is complex and expensive to pump a cooling fluid from beneath ground level to a height of more than 50 meters. By making the cooling fluid circulate in a closed system the fluid on the way down will assist in pushing, the fluid on the way up, up. Hereby the pump substantially only have to overcome the flow resistance in the fluid conduits.

Furthermore, by making the fluid circuit closed, direct interaction with the surroundings can be avoided. This is advantageous in that it hereby is possible to avoid the introduction of unwanted foreign objects and other such as humidity, bugs, sand, dirt, salt and other to the inside of the wind turbine. It is hereby possible to obtain as much more controlled environment inside the wind turbine, hereby prolonging the life of the different wind turbine components and due to the controlled environment also enabling, that the life of the components can be predicted more exactly.

In an aspect of the invention, said foundation comprise two or more separate fluid conduits of said temperature control means.

Fluid conduits placed in the foundation can be very hard to access once installed and even though the foundation provides a high degree of protection against external wear and tear, no system can ever be completely failsafe. It is therefore advantageous to provide the foundation with at least two separate fluid conduits, in that it hereby is possible to provide the temperature control system with redundancy. E.g. if three individual fluid conduits in the base of three individual closed circuits was enough to provided sufficient cooling or heating to the wind turbine, the foundation could be provided with six individual fluid conduits of six individual closed circuits, hereby providing the foundation with a 100% overcapacity and thereby substantially eliminating the risk of the temperature control systems capacity being reduced to an unwanted level during the life of the wind turbine.

In an aspect of the invention, said fluid conduits are adjoined to at least a part of said strengthening structure by way of separate fixating means such as clamps, strips, wire, tape or other.

Adjoining the fluid conduits to the strengthening structure by means of fixating means being separate from both the fluid conduits and the strengthening structure is advantageous in that it hereby is possible to easily adapt the layout of the fluid conduits in the foundation to the specific needs or requirements of a specific wind turbine type, a specific erection site, a specific type of strengthening structure, specific temperature control means or other.

In an aspect of the invention, said fluid conduits are adjoined to at least a part of said strengthening structure by way of fixating means being integrated in said strengthening structure.

Integrating the fixating means in the strengthening structure is advantageous in that it reduces the overall manufacturing time of the foundation and in that the heat capacity of the foundation is more predictable in that the layout of the fluid conduits has to be predetermined.

In an aspect of the invention, said cooling fluid is a liquid such as an anti-freeze and water solution, methanol, propylene glycol or potassium acetate.

Liquids such as anti-freeze solution and other is relatively simple and inexpensive to move over large distances, it has a relatively high heat capacity and relatively good heat conducting qualities and it is therefore advantageous to use a liquid as cooling fluid in a temperature control system for a wind energy converter.

In an aspect of the invention, at least a main part of said strengthening structure is made of steel.

Generally steel is a very good conductor of heat and usually up to 50 times better than concrete. It is therefore advantageous that the strengthening structure is made of steel in that the strengthening structure hereby is capable of aiding the distribution of the e.g. heat throughout the foundation, hereby increasing the efficiency of the temperature control means.

In an aspect of the invention, said strengthening structure is one or more welded mesh reinforcements.

Using welded mesh reinforcements as the strengthening structure in a foundation is advantageous in that the mesh provides excellent means for adjoining the temperature control means to the strengthening structure in a desired way.

The invention further provides for a wind turbine foundation comprising a strengthening structure. The wind turbine foundation characterized in that the foundation comprises at least a part of temperature control means for heat exchanging with one or more areas of a wind turbine and in that at least a part of said temperature control means adjoins said strengthening structure.

A foundation comprising means for heat exchanging with one or more areas of a wind turbine is advantageous in that it hereby is possible to create a cost-efficient heat sink of the temperature control means.

Furthermore, by adjoining the temperature control means with the strengthening structure the capacity and the qualities of the foundation become more predictable.

In an aspect of the invention, said foundation comprises one or more fluid conduits of said temperature control means.

By providing the foundation with fluid conduits it is possible to create a flow of cooling fluids inside or through the foundation. This is advantageous in that it provides for a simple and cost-efficient way of exchanging heat with a wind turbine.

In an aspect of the invention, said foundation comprises two or more separate fluid conduits of said temperature control means.

This is advantageous, in that it hereby is possible to provide the heat exchanging qualities of the foundation with redundancy.

In an aspect of the invention, wherein at least a main part of said strengthening structure is made of steel.

Even further the invention provides for a method for controlling the temperature of one or more areas of a wind turbine by heat exchanging between said areas and at least a part of a foundation for said wind turbine, wherein said heat exchanging is performed by means of one or more fluid conduits partly adjoining at least a part of a strengthening structure of said foundation.

Hereby is achieved an advantageous embodiment of a method for controlling the temperature of one or more areas of a wind turbine.

In an aspect of the invention, said heat exchange is preformed by transporting heat from said areas to at least a part of said solid wind turbine base or by transporting heat from at least a part of said solid wind turbine base to said areas.

In an aspect of the invention, the bulk of said heat transported from said areas to said foundation is dissipates in said foundation and wherein the bulk of said heat transported from said foundation to said areas is absorbed in said foundation.

In an aspect of the invention, said heat is exchanged by establishing a flow of cooling fluids in and between said areas and at least a part of said foundation.

In an aspect of the invention, said cooling fluids flows in one or more closed circuits making said cooling fluid circulate in said temperature control means.

In an aspect of the invention, said temperature control means comprise two or more separate closed circuits of cooling fluid at least partly embedded in said foundation.

Even further the invention provides for use of a wind turbine foundation in a wind energy converter, wherein said wind energy converter is land based.

Using a wind turbine foundation according to the invention as foundation for a land based wind energy converter according to the invention is advantageous, in that such a foundation provides simple and cost-efficient means for controlling the temperature of one or more areas of the wind turbine

BRIEF DESCRIPTION OF THE DRAWINGS

The invention will be described in the following with reference to the figures in which FIG. 1. illustrates a large modern wind turbine known in the art, as seen from the front, FIG. 5B illustrates a part of a cross section of an embodiment of fluid conduits adjoining the strengthening structure inside a wind turbine foundation, as seen from the front, FIG. 8 illustrates a simplified wind energy converter comprising five separate cooling fluid circuits, as seen from the side, FIG. 9 illustrates a simplified wind energy converter comprising four separate fluid conduits through the heat sink, as seen from the side.

DETAILED DESCRIPTION OF THE INVENTION

Figure 1:
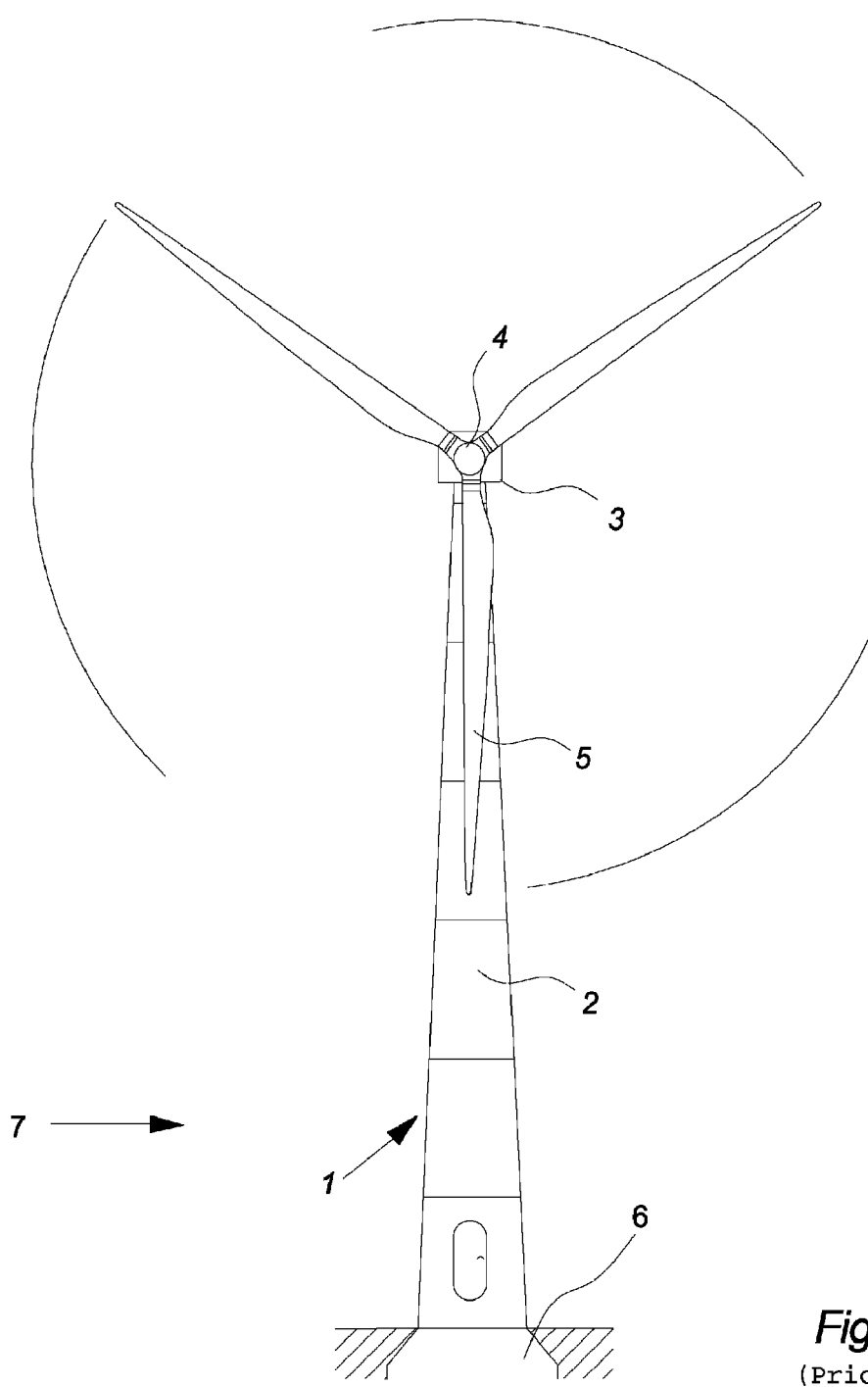

FIG. 1 illustrates a wind energy converter 7 comprising a modern wind turbine 1 placed on and rigidly connected to a wind turbine foundation 6. The wind turbine 1 comprises a tower 2 and a wind turbine nacelle 3 positioned on top of the tower 2. The wind turbine rotor 4, comprising three wind turbine blades 5, is connected to the nacelle 3 through the low speed shaft which extends out of the nacelle 3 front.

Figure 2:
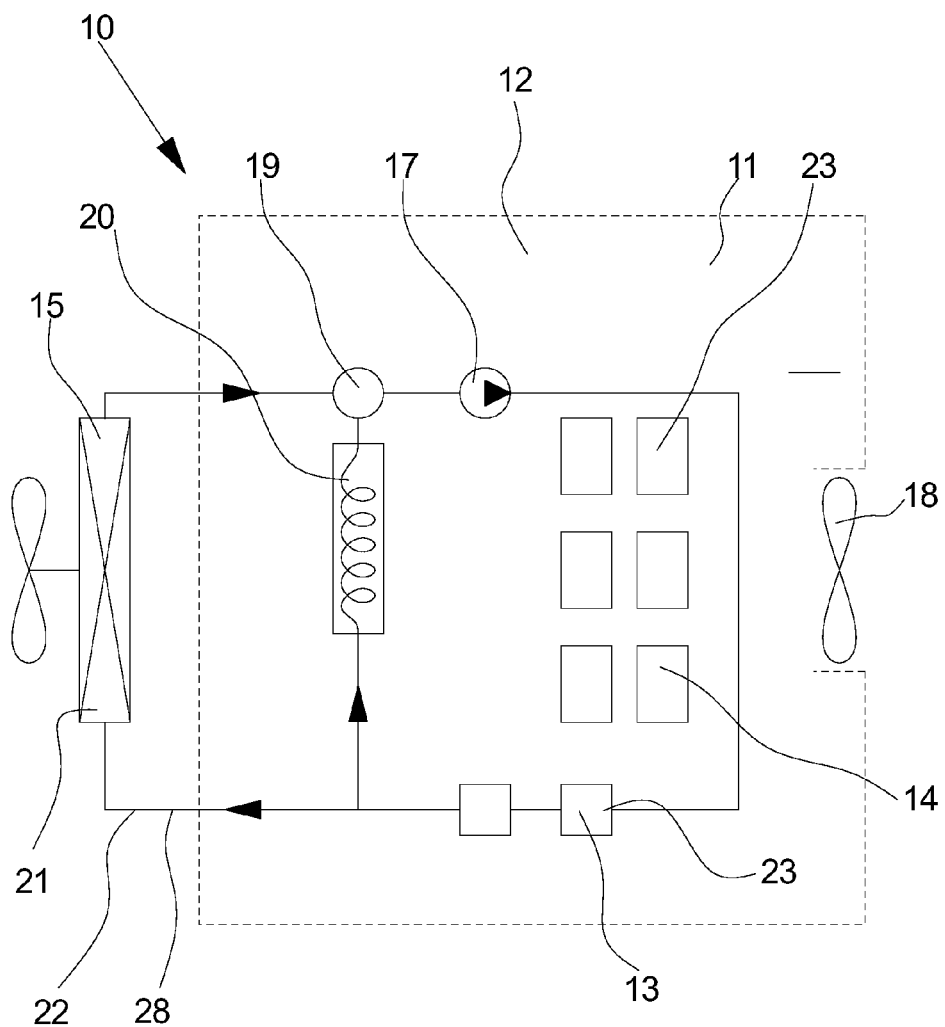
FIG. 2 illustrates a simplified embodiment of a traditional temperature control system for a wind turbine component.

FIG. 2 illustrates an embodiment of traditional temperature control means 10 for controlling the temperature of one or more areas of a wind turbine 1, such as the nacelle 3 and/or wind turbine components 11 situated in the nacelle 3, in the tower or in or at other parts of the wind turbine 1 during normal operation of the wind turbine 1.

In this embodiment the wind turbine component 11 is a power converter 12 but in another embodiment the component could be a wind turbine gear, generator, bearings, hydraulic system, lubrication system, the entire or parts of the nacelle 3 or tower 2 or rotor 4 or any combination thereof.

In this embodiment the power converter 12 comprising different kind of power handling equipment such as power resistors 13, motherboards 14 and other. In this embodiment the motherboards 14 is air cooled, and the power resistors 13 is both air and fluid cooled.

A heat sink 21 of the temperature control means 10—in form of a main radiator 15 with a fan—is mounted outside the power converter 12 in a location enabling heat exchange with the air outside the wind turbine 1. From the main radiator 15 a cooling fluid flows through a bidirectional valve 19 and through a pump 17 which creates the flow of the cooling fluid. From the pump 17 the cooling fluid flows through some of the equipment in the power converter 12. The heated cooling fluid then returns to the heat sink 21 to be cooled again.

In this embodiment the power converter 12 also contains equipment which only can or needs to be air cooled. The cabinet surrounding the power converter 12 is therefore provided with at least one cabinet fan 18 generating airflow of air from the nacelle 3 or of air from the outside of the wind turbine 1.

If the wind turbine 1 is placed in a cold environment and the weather is calm making the power production, and thereby most of the internal heat emission, stops, it can be necessary to heat the power handling equipment in the power converter 12. This can be done by activating the bidirectional valve 19 changing the direction of the cooling fluid flow and making it circulate inside the power converter 12 and pass a cooling fluid heater 20.

If the ambient temperature is high and the weather is windy, the equipment in the wind turbine 1 could produce so much heat, that the temperature rises above a certain level which makes some of the equipment shut down to protect them from being damaged by the high temperature. This will make most or the entire power production stop, and thereby also stop most of the internal heat production.

Figure 3:
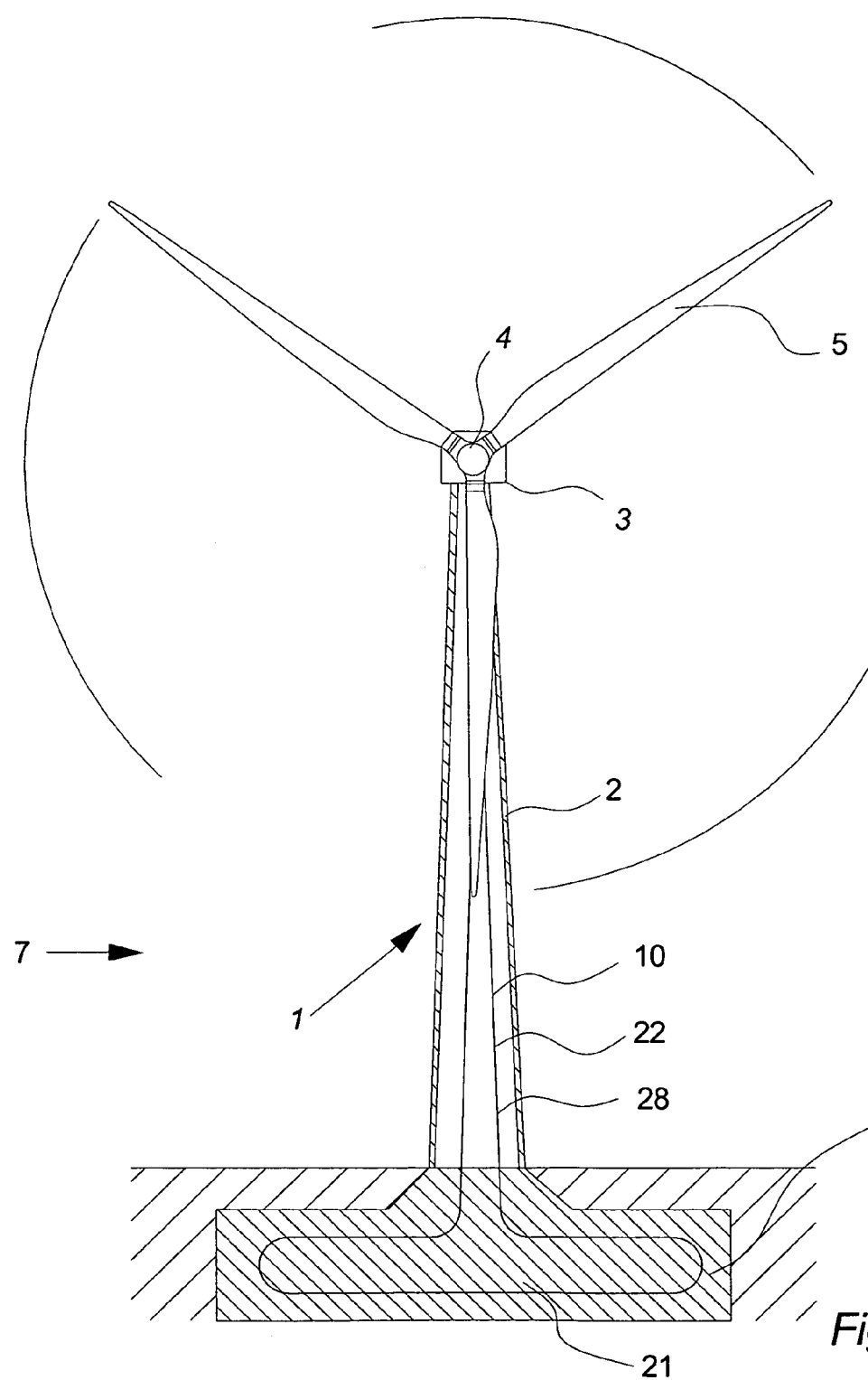
FIG. 3 illustrates a cross section of an embodiment of a wind energy converter according to the invention comprising a foundation acting as a heat sink of the temperature control means, as seen from the front.

FIG. 3 illustrates a cross section of an embodiment of a wind energy converter 7 according to the invention comprising a foundation 6 acting as a heat sink 21 of the temperature control means 10, as seen from the front.

In this embodiment of the invention the wind energy converter 7 is land based and it comprises a wind turbine 1 placed on a wind turbine foundation 6. The foundation 6 is in this embodiment substantially made at the site of concrete reinforced by a strengthening structure 16, but in another embodiment the foundation 6 could be completely or partly prefabricated e.g. in the form of one or more metal or concrete shells or structures which e.g. could be filled at the site with a filler such as concrete, stones, sand or other.

In this embodiment the temperature control means 10 comprises a closed fluid conduit 22 running from the nacelle 3, down through the tower 2, into the foundation 6 before it returns to the nacelle 3. In FIG. 3 the routing of the fluid conduit 22 in the nacelle 3, tower 2 and in the foundation 6 is somewhat simplified and in another embodiment the fluid conduit 22 would e.g. describe a more complex pattern in the foundation 6 before returning to the wind turbine 1.

In another embodiment of the invention the temperature control means 10 could also comprise an open flow of cooling fluids e.g. if the foundation 6 comprised a reservoir (not shown) whereto the cooling fluids where pumped e.g. from the nacelle and wherefrom the cooling fluids where pumped into the wind turbine but in a preferred embodiment of the invention the cooling fluids of the temperature control means 10 circulates in a closed circuit 28.

In the illustrated closed circuit 28 the cooling fluid is brine but in another embodiment of the invention the cooling fluid could be another kind of anti-freeze and water solution, such as water and isopropyl alcohol. The cooling fluid could also be any other kind anti-freeze solution, such as methanol, propylene glycol or potassium acetate or it could be ammoniac, $CO_2$ and/or Freon gases.

In this embodiment of the invention the temperature control means 10 controls the temperatures of specific components 11 in the nacelle 3, but in another embodiment the temperature control means 10 could also or instead control the temperature of the entire nacelle 3 including the air inside the nacelle, it could control the temperature of components in the tower 2 and/or of the air in the tower, it could control the temperature of specific components 11 of the rotor 4 e.g. to maintain the blades 5 frost-free, it could control the temperature of wind turbine components 11 placed outside the wind turbine e.g. in a neighboring house (not shown) and/or the temperature inside said house or any combination hereof.

In another embodiment of the invention at least a part of the temperature control means 10 being located in the foundation 6 could also be formed as one or more heat-pipes (not shown). In their simplest forms heat-pipes comprise a sealed vessel containing a working fluid and its vapour, together with a capillary wick lining system. A heat-pipe is basically a very efficient super heat conductor, which provides a thermal absorption and transfer system with the capability to move large amounts of power in the form of heat energy.

The application of heat at any point on the heat-pipe surface causes a liquid/vapour phase change inside, which enables heat energy to be transmitted in the vapour phase with only a minimal temperature gradient. In terms of thermal conductivity, a heat-pipe can exhibit a thermal performance which can exceed that of an equivalent sized component made from pure copper by over 1000 times.

Typically, heat-pipes are produced in rod form with a circular cross section but other shapes are also possible such as other cross sections or flattened section heat-pipes.

Heat-pipes could be used to transfer heat inside the foundation 6 e.g. if the foundation was a mono pile foundation 25 or in connection other types of foundations 6.

Figure 4:
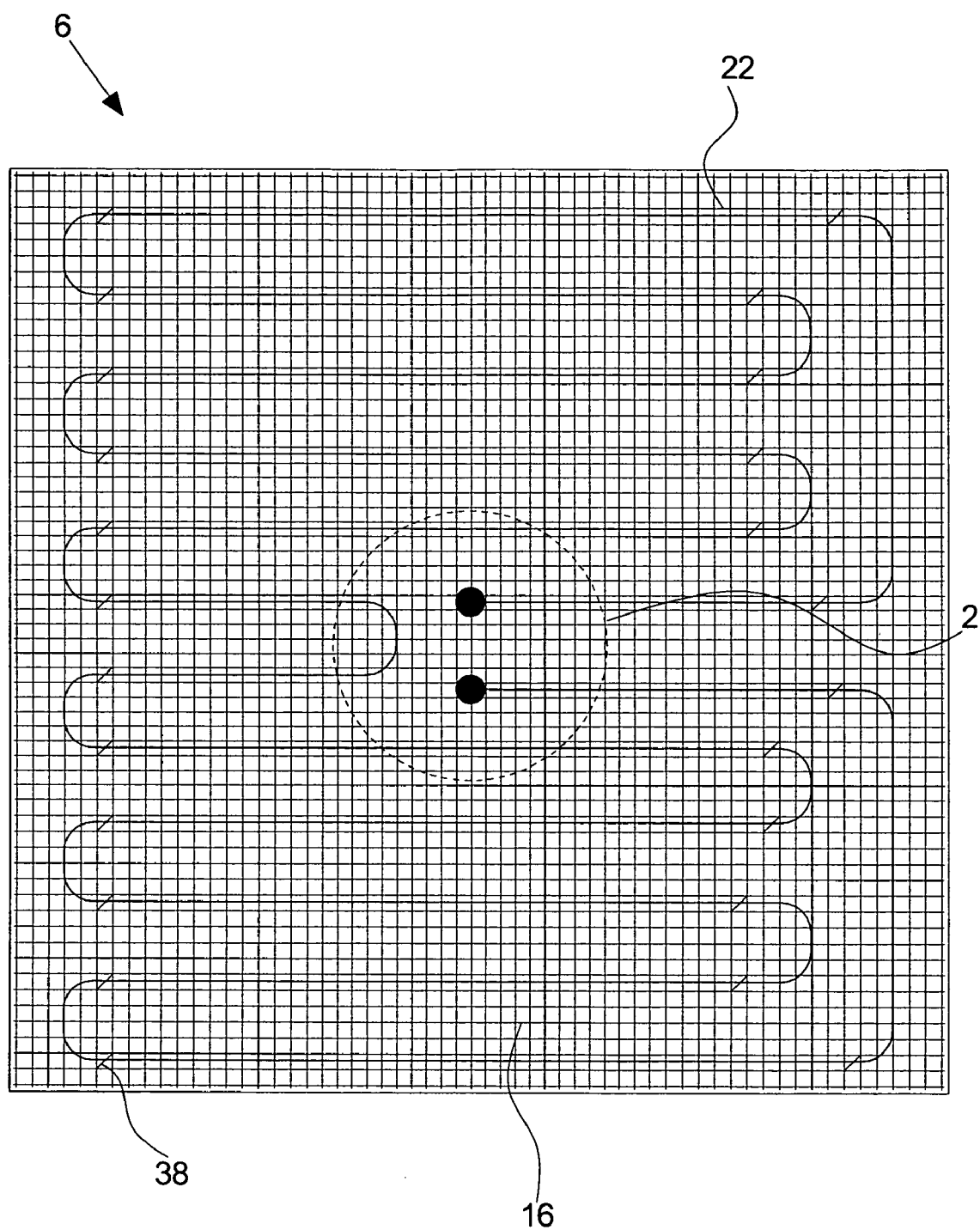
FIG. 4 illustrates a cross section of a wind turbine foundation comprising fluid conduits, as seen from the top.

FIG. 4 illustrates a cross section of a wind turbine foundation 6 comprising fluid conduits 22, as seen from the top.

In this embodiment of the invention the foundation 6 comprise at least one hose 22 running inside the foundation, in a way which ensures that e.g. the heat from the cooling fluid flowing through the hose, is dissipates into the foundation 6 and the surrounding ground 9 as efficiently as possible or as needed. In this embodiment the hose 22 describes a kind of zigzag pattern but in another embodiment the fluid conduits 22 could be placed in another pattern such as spirals, circles, squares or other both in the horizontal and the vertical plane.

In this embodiment the hose 22 is securely connected to the strengthening structure 16 of the foundation 6 by being connected to a welded mesh reinforcement placed inside the foundation 6 by means of fixating means (38). In this embodiment the fixating means (38) is clamps—joining the fluid conduits 22 to the strengthening structure 16 but being formed separate from both—but in another embodiment the fluid conduit 22 could be connected to the strengthening structure 16 of the foundation 6 by being tied to the structure 16 by means of tape, wire, strips or other.

In another embodiment the fluid conduit 22 could adjoin the strengthening structure 16 of the foundation 6 by being placed between guiding pins e.g. of a welded mesh reinforcement or the fluid conduit 22 could even be formed integrally in the strengthening structure 16 e.g. in the form of the strengthening structure 16 comprising pipes or other.

In this embodiment of the invention the fluid conduit 22 is a hose but in another embodiment the conduits 22 could be one or more pipes, tubes, channels, ducts or other embedded in the foundation 6 and adjoined to the strengthening structure 16 of the foundation 6. In an embodiment the fluid conduit 22 could further comprise fins, surface irregularities or other that could increase the surface of the fluid conduit 22 to improve its ability to dissipate or absorb heat.

If the foundation 6 is made at the erection site, the fluid conduits 22 could be casted into the foundation 6 during the making e.g. by attaching it to the metal reinforcement. The fluid conduits 22 could also be integrated in the reinforcement or if the foundation 6 is partly or completely prefabricated the fluid conduits 22 could be integrated into or connected to the prefabricated shells or structures.

Figure 5:
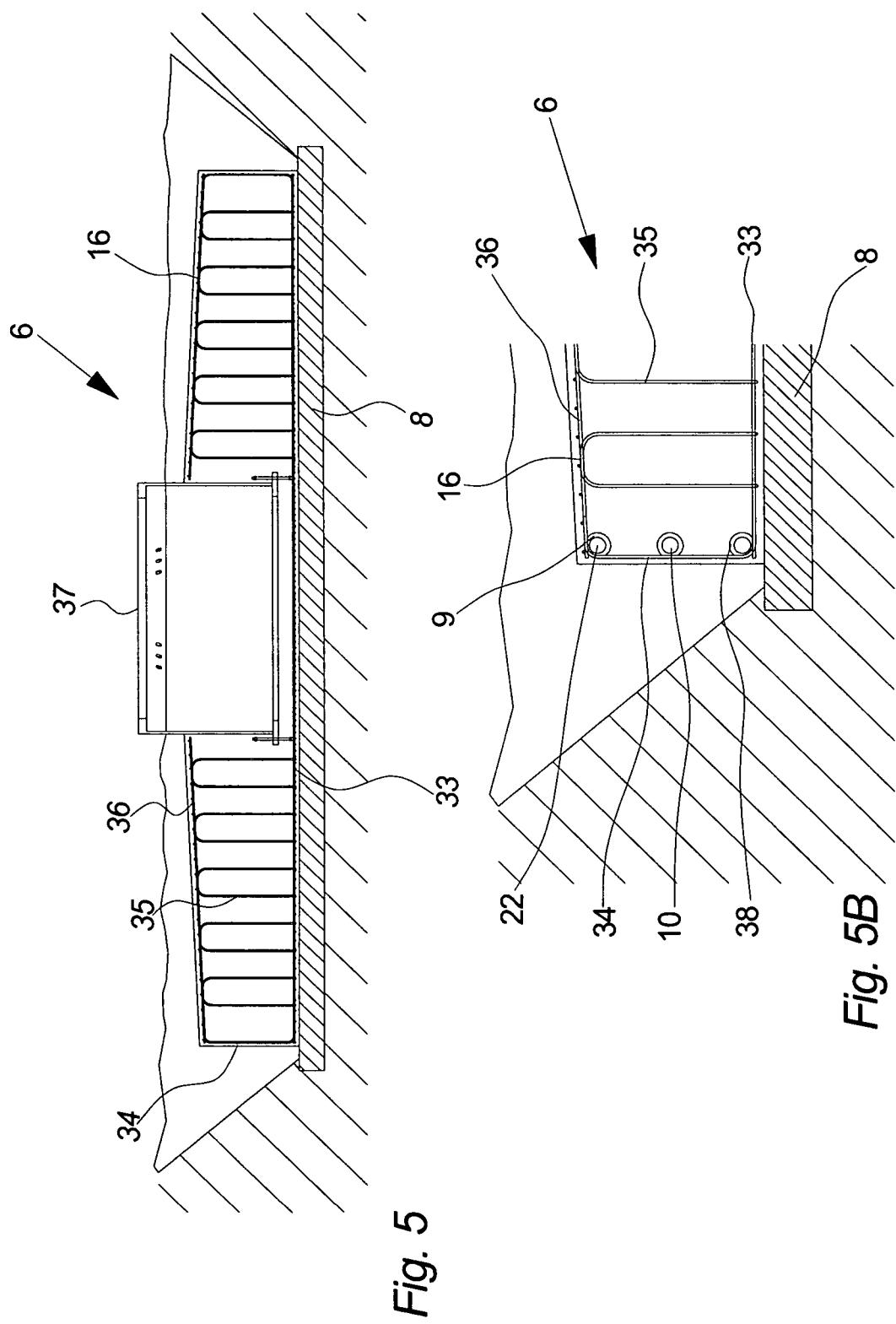
FIG. 5 illustrates a wind turbine foundation known in the art for a land based wind turbine, as seen from the front.

FIG. 5 illustrates cross section of a wind turbine foundation 6 known in the art for a land based wind turbine 1, as seen from the front.

This type of foundation 6 is typically made by digging a large hole in the ground and cast a floor 8 in the hole. Hereafter a formwork (not shown) is raised to substantially define the outer edges of the foundation 6. The foundation is provided with a strengthening structure 16 in the form of bottom reinforcement 33, edge reinforcement 34, reinforcement arches 35, top reinforcement 36 and a cylindrical metal centre part for connecting the foundation 6 to the wind turbine tower 2. In this embodiment all the reinforcement is formed by metal rods or welded mesh metal reinforcement.

After establishing the strengthening structure 16 concrete is poured into the "mould" and when the concrete has solidified the formwork is removed and the foundation 6 is covered with some of the dug up earth.

FIG. 5B illustrates a part of a cross section of an embodiment of fluid conduits 22 adjoining the strengthening structure 16 inside a wind turbine foundation 6, as seen from the front. The strengthening structure 16 is formed by a bottom reinforcement 33, edge reinforcement 34, reinforcement arches 35, and top reinforcement 36.

In this embodiment of the invention the fluid conduits 22 is formed as one pipe circulating the outer edges of the foundation 6 before returning to the wind turbine 1. In another embodiment the foundation could comprise several individual fluid conduits 22.

In this embodiment the pipe is placed in a number of fixating means 38 of the strengthening structure 16. In this embodiment the fixating means 38 in integrated in the strengthening structure 16 as a number of retainers 9 formed by the edge reinforcement 34 as circular holes, through which the pipe is lead to substantially fixate the fluid conduits 22 position during the making of the foundation 6 and throughout the life of the foundation 3.

Other embodiments of integrated fixating means 38 is also feasible such as integrated hooks, pins, shelves, ducts or other enabling that the fluid conduits 22 can be adjoined with the strengthening structure 16.

In this embodiment the fluid conduits 22 runs on the inside of the strengthening structure 16 but in another embodiment the fluid conduits 22 could run on the outside of the strengthening structure 16 or both and in another embodiment the fluid conduits 22 could circulate more or less than three times inside the foundation 6 such as one, two, four or more times.

Figure 6:
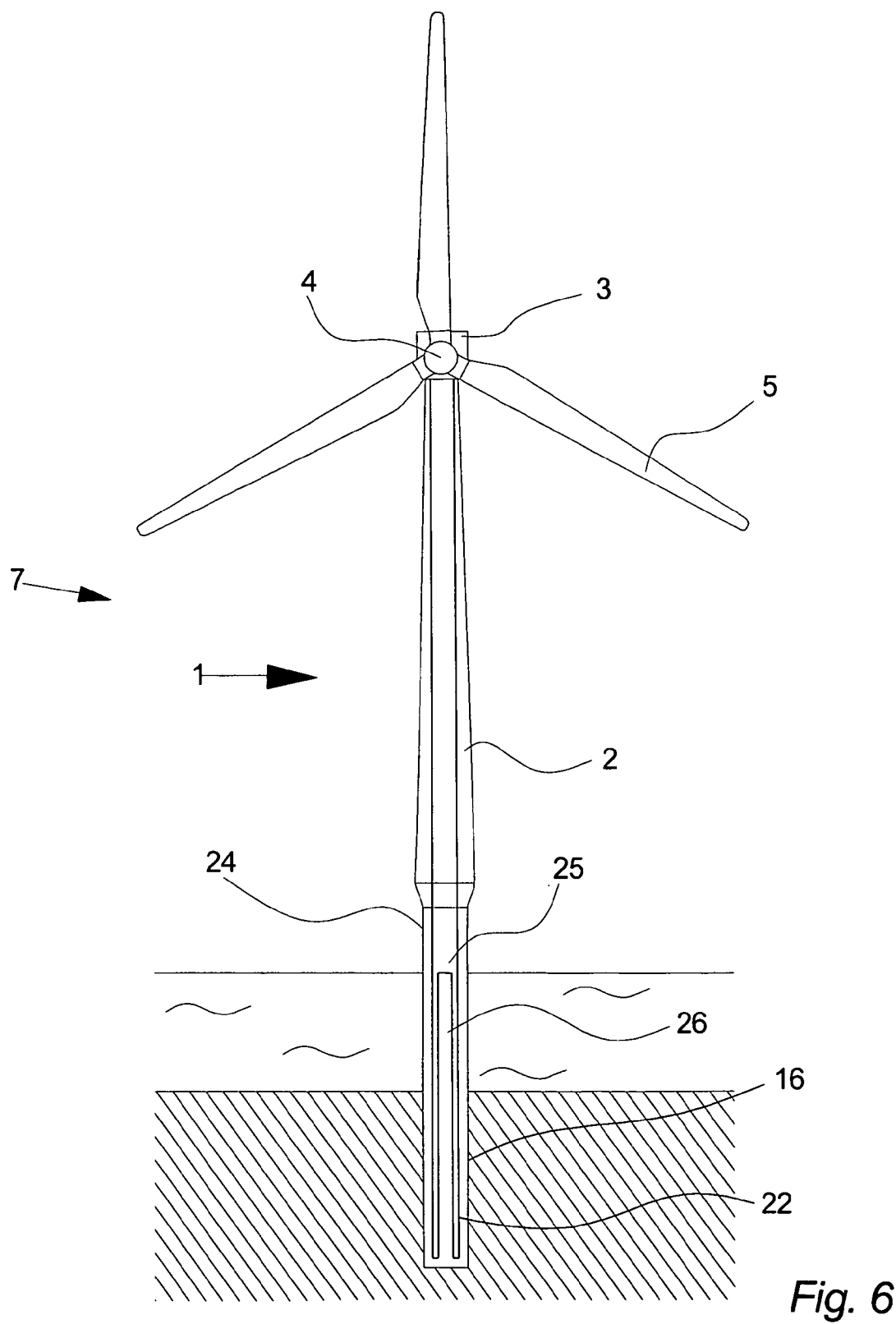
FIG. 6 illustrates a cross section of an offshore wind energy converter comprising a mono pile foundation and fluid conduits, as seen from the front.

FIG. 6 illustrates a cross section of an offshore wind energy converter 7 comprising a mono pile foundation 25 comprising fluid conduits 22, as seen from the front.

In this embodiment of the invention the wind energy converter 7 comprise a wind turbine 1 placed on a plinth 24 of a mono pile foundation 25.

A mono pile foundation 25 comprises a pile 26 such as a steel pile 26, most often with a diameter of between 3.5 and 4.5 meters. The pile 26 is driven into the seabed to a certain depth. How deep the pile 26 is placed among other things depends on the type of underground but typically it is between 10 and 20 meters.

In this embodiment of the invention the wind energy converter 11 is provided temperature control means 10 comprising fluid conduits 22 running substantially vertically up and down inside the pile 26, making the mono pile foundation 25 acts as a substantially vertical heat sink 21 of the temperature control means 10. In another embodiment the fluid conduits 22 could run in circles or form a helix in the pile 26.

In this embodiment the vertical extend of the fluid conduits 22 are substantially the vertical extend of the pile 26 but in another embodiment it could be limited to the vertical length of the foundation 25 being surrounded by water, the vertical length of the foundation 25 above the waterline, the vertical length of the foundation 25 being surrounded by the seabed or any combination hereof.

No matter the type of foundation 6 the fluid conduits 22 could be integrated in the strengthening structure 16 of the foundation 6 and/or the fluid conduits 22 could be separate pipes, channels, ducts, tubes or other attached to the pile 26 or in any other way being fixated by, guided by or mounted on the foundation 6. In this embodiment of a foundation 6 it would mean that the fluid conduits 22 could be integrated in the walls of the pile 26 or the fluid conduits 22 could be one or more separate tubes or pipes being attached to the pile 26.

Figure 7:
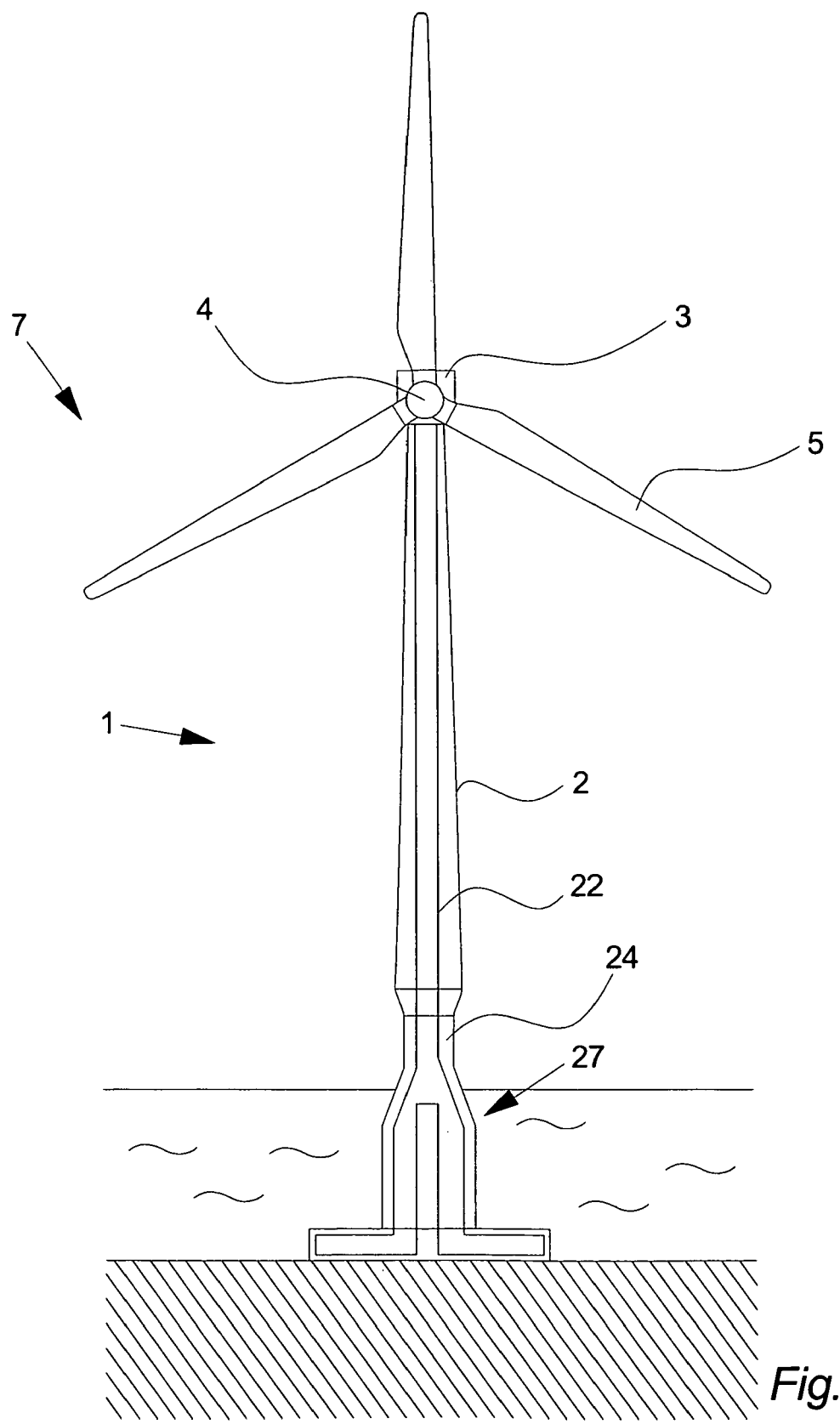
FIG. 7 illustrates a cross section of an offshore wind energy converter comprising a gravitation foundation with integrated fluid conduits, as seen from the front.

FIG. 7 illustrates a cross section of an offshore wind energy converter 7 comprising a gravitation foundation 27 with integrated fluid conduits 22, as seen from the front.

Most of the existing offshore wind energy converters 7 use gravitation foundations 27 and the illustrated gravitation foundation 27 is made of reinforced concrete but in another embodiment it could also be made of a cylindrical steel tube placed on a flat steel box on the seabed.

Usually a steel gravity foundation 27 is considerably lighter than concrete foundations 27 and although the finished foundation has to have a weight of e.g. more than 1,000 tonnes, the steel structure can be made relatively light enabling that a steel gravity foundation 27 can be transported and installed by use of a barges relatively rapidly, using the same fairly lightweight crane used for the erection of the wind turbine 1.

The gravity foundation 27 is filled with olivine (a very dense mineral), stones, sand, gravel, concrete or any combination hereof which gives the foundations sufficient weight to withstand storm, waves, ice pressure and other.

In this embodiment of the invention fluid conduits 22 runs inside the gravity foundation 27 to make the foundation 6 form a heat sink 21 of the temperature control means 10.

FIG. 3 to 7 illustrates different embodiments of the invention in relation to specific embodiments of land based or offshore foundation 6, but other types of foundations 6 can off course also be used, such as tripod foundations (not shown), pier foundations (not shown), floating foundations (not shown) or other.

Tripod foundations (not shown) are used with offshore wind turbines 1 and they typically comprise a steel pile below the turbine tower from which a steel frame emanates which transfers the forces from the tower into three steel piles. The three piles are driven 10 to 20 meters into the seabed depending on soil conditions and ice loads. The advantage of the three-legged model is that it is suitable for larger water depths and at the same time only a minimum of preparations are required at the site before installation.

Pier foundations (not shown) are used in relation with land based wind turbines 1 and are typically formed as of an inner and an outer corrugated metal pipe wherein between a number of bolt are concreted and to which the wind turbine tower 2 is attached.

Floating foundations (not shown) are any type of foundation 6 which basically floats in the sea.

FIG. 8 illustrates a simplified wind energy converter 7 comprising five separate cooling fluid circuits 28.

In this embodiment of the invention the wind energy converters 7 temperature control means 10 comprise five individual and separate closed circuits 28 of cooling fluid but in another embodiment the temperature control means 10 could comprise another number of circuits 28 such as two, three, four, six, seven or more.

Each circuit 28 comprise a fluid pump 17 located in the nacelle 3 for creating circulation of the fluid in the fluid conduit 22. In another embodiment the pumps 17 could be placed elsewhere such as in the tower 2, outside the wind turbine e.g. in a neighbouring house or even in the foundation 6.

In this embodiment the fluid conduits 22 extends from the nacelle 3, down through the tower 2, into the foundation 6 to make the foundation 6 act as a heat sink 21 of the temperature control means 10 and the it returns to the nacelle 3.

In this embodiment the cooling fluid circulating in the fluid conduits will also flow through or pass the components 11 in the nacelle 3 needing heating or cooling or e.g. through the blades 5 to deice these. This could e.g. be done by mounting a temperature or remote controlled mixing valve at each component 11 to ensure optimal operating temperature and/or reduce or eliminate thermal fluctuations.

In the nacelle 3, in the tower 2 and/or elsewhere the cooling fluid could also pass a large cooling fluid to air heat exchanger (not shown). This or these heat exchangers could be used to control the temperature of the air in the nacelle 3, in the tower 2 and/or elsewhere, thereby making it possible to eliminate substantially all open interaction with the surroundings e.g. in the nacelle 3, enabling that the nacelle 3 can be completely closed, making the environment in the nacelle 3 very controlled.

In some embodiments of wind energy converters 7 heat producing or needing components 11 are also placed inside the tower 2 and in such a case the cooling fluid would also pass these components 11 or even by means of cooling fluid to air heat exchangers enabling that the temperature inside the tower 2 could be controlled.

In another embodiment the fluid conduits 22 could also extend outside the tower 2 e.g. to cool or heat wind turbine components 11 placed in a neighbouring house (not shown).

FIG. 9 illustrates a simplified wind energy converter 7 comprising four separate fluid conduits 22 through a heat sink.

In this embodiment of the invention one large pump 17 is creating a flow of cooling fluids in four separate and individual fluid conduits 22 running through the tower 2, the foundation 6 and back again. Each of the fluid conduits 22 comprises a valve 29 which could be an on/off valve 29 to control the flow through the specific conduits 22. In this embodiment it is therefore possible to control the speed of the flow of cooling fluid by opening or shutting more or less fluid conduits 22.

In this embodiment the temperature control means 10 further comprise a cooling fluid to air heat exchanger in the nacelle 3 to enable that the nacelle 3 can be substantially sealed of from the surroundings, but in another embodiment the temperature control means 10 could further comprise a traditional cooling system heat exchanging with the surrounding air as described in FIG. 2. This traditional cooling system could control the air temperature in the nacelle or it could be used to control the temperature of specific components 11.

The temperature control means 10 illustrated in FIG. 3 to 9 are all configured to transport the bulk of the heat produced or needed in the different areas 23 of the wind turbine 1 to the foundation 6, but e.g. if the temperature control means 10 further comprise a traditional cooling system for heat exchanging with the surrounding air it could be only a fraction to the heat produced or needed that was exchanged with the foundation 6.

Figure 10:
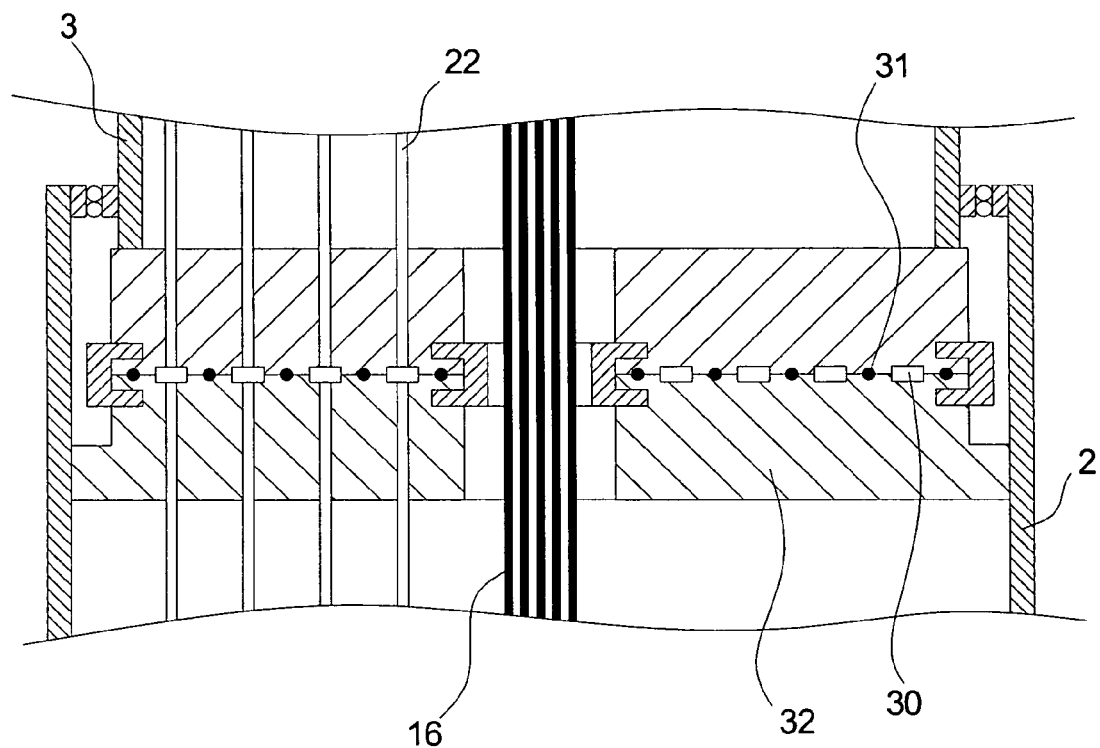
FIG. 10 illustrates a cross section of an embodiment of a cooling fluid union.

FIG. 10 illustrates a cross section of an embodiment of a cooling fluid union 32.

In this embodiment of the invention the wind turbine 1 is provided with a union 32 for guiding the cooling fluid between the tower 2 and the nacelle 3. In traditional wind turbines 1 the nacelle 3 is able to rotate in relation to the tower 2 to ensure that the rotor 4 always faces the wind.

To enable the cooling fluid to pass this rotating joint, the joint is provided with a union 32 comprising an upper part connected to the nacelle 3 and a lower part connected to the tower 2. The union is provided with a number of annular passageways 30 between the two part and the passageways 30 are separated by a form of sealing 31 e.g. in the form of O-rings. The fluid conduits 22 are through both the upper part and the lower part connected to the passageways 30 enabling that the fluid can pass the rotating joint without the fluid in the different fluid conduits being mixed.

In this embodiment of the invention the centre of the union 32 is hollow enabling that power cables and other can be guided through the union 32.

Usually the nacelle 3 only rotates a limited number of times in one direction before it is forced to rotate in the opposite direction. In another embodiment of the invention it is therefore also feasible that the fluid conduits 22 are lead from the nacelle 3 to the tower 2 and back by means of flexible hoses or the like hanging more or less freely from the nacelle 3 down into the tower 2 like power cables does in many wind turbines 1.

The invention has been exemplified above with reference to specific examples of temperature control means 10, wind energy converters 7, foundations 6, heat sinks 21 and other. However, it should be understood that the invention is not limited to the particular examples described above but may be designed and altered in a multitude of varieties within the scope of the invention as specified in the claims.

What is claimed is:

1. A wind energy converter comprising
   a wind turbine,
   a wind turbine foundation including a strengthening structure formed of steel, and
   a temperature controller for controlling the temperature of one or more areas of said wind turbine in the form of one or more fluid conduits for transporting a cooling fluid through the foundation,
   wherein at least a part of said one or more fluid conduits is fixed to and adjoins said strengthening structure.

2. The wind energy converter according to claim 1, wherein said temperature controller further comprises one or more pumps for creating a flow of said cooling fluid and one or more heat sinks for giving off heat from or supplying heat to said cooling fluid.

3. The wind energy converter according to claim 1, wherein at least a part of said foundation further constitutes part of a heat sink of said temperature controller.

4. The wind energy converter according to claim 2, wherein said heat sink comprises heat transfer means for dissipating the bulk of said areas excess heat to said foundation and for absorbing the bulk of said areas needed heat from said foundation.

5. The wind energy converter according to claim 1, wherein said one or more fluid conduits are formed as one or more closed circuits making said cooling fluid circulate in said temperature controller.

6. The wind energy converter according to claim 1, wherein said foundation is provided with two or more separate fluid conduits of said temperature controller.

7. The wind energy converter according to claim 1, wherein said one or more fluid conduits are fixed to at least a part of said strengthening structure by way of separate fixating means.

8. The wind energy converter according to claim 1, wherein said one or more fluid conduits are fixed to at least a part of said strengthening structure by way of fixating means being integrated in said strengthening structure.

9. The wind energy converter according to claim 1, wherein said cooling fluid is a liquid.

10. The wind energy converter according to claim 1, wherein said strengthening structure is one or more welded mesh reinforcements.

11. Use of a wind energy converter according to claim 1 wherein said wind energy converter is land based.

12. A wind turbine foundation comprising a strengthening structure at least a main part of which is formed of steel, wherein
    a temperature controller is provided for heat exchanging with one or more areas of a wind turbine in the form of one or more conduits carrying a heat exchange fluid and extending through the foundation, the one or more conduits being fixed to and adjoining said strengthening structure.

13. The wind turbine foundation according to claim 12, wherein said foundation is provided with two or more separate fluid conduits of said temperature controller.

14. A method for controlling the temperature of one or more areas of a wind turbine by heat exchanging between said areas and at least a part of a foundation for said wind turbine, wherein said heat exchanging is performed by one or more fluid conduits at least partly fixed to and adjoining a steel strengthening structure of said foundation.

15. The method according to claim 14, wherein the bulk of said heat transported from said areas to said foundation is dissipated in said foundation and wherein the bulk of said heat transported from said foundation to said areas is absorbed in said foundation.

16. The method according to claim 14, wherein said heat is exchanged by establishing a flow of cooling fluids in and between said areas and at least a part of said foundation.

17. The method according to claim 16, wherein said cooling fluids flows in one or more closed circuits making said cooling fluid circulate between said areas and said foundation.

18. A wind turbine comprising:
    a tower;
    a foundation structure supporting the tower formed of concrete reinforced by a steel strengthening structure; and
    a temperature controller for exchanging heat between heat-producing areas of the turbine and the foundation in the form of one or more fluid conduits which carry a heat exchange fluid;
    wherein the one or more fluid conduits adjoin and are secured to the strengthening structure by separate fixings.

19. The wind turbine according to claim 18, wherein the fixings are selected from the group consisting of clamps, strips, wire and tape.

20. A wind turbine comprising;
    a tower;
    a foundation structure supporting the tower formed of concrete reinforced by a steel strengthening structure; and
    a temperature controller for exchanging heat between heat-producing areas of the turbine and the foundation, in the form of one or more fluid conduits which carry a heat exchange fluid;
    wherein the one or more fluid conduits adjoin and are secured to the strengthening structure by fixings integrated into the strengthening structure.

* * * * *

UNITED STATES PATENT AND TRADEMARK OFFICE
CERTIFICATE OF CORRECTION

| | | |
|---|---|---|
| PATENT NO. | : 7,963,740 B2 | Page 1 of 3 |
| APPLICATION NO. | : 12/435049 | |
| DATED | : June 21, 2011 | |
| INVENTOR(S) | : Gerner Larsen et al. | |

It is certified that error appears in the above-identified patent and that said Letters Patent is hereby corrected as shown below:

In the Specification:

At column 1, line approx. 45, "converters system", should read -- converter's system --

At column 2, line approx. 12-13, "in American patent No U.S. No. 6,676,122 B1", should read -- in U.S. Pat. No. 6,676,122 B1 --

At column 2, line approx. 66-67, "it that this", should read -- in that this --

At column 4, line approx. 8, "have to overcome", should read -- has to overcome --

At column 4, line approx. 20, "said foundation comprise", should read -- said foundation comprises --

At column 4, line approx. 31, "enough to provided", should read -- enough to provide --

At column 4, line approx. 62-63, "is relatively simple", should read -- are relatively simple --

At column 4, line approx. 63, "it has a", should read -- have a --

At column 5, line approx. 59, "is dissipates in", should read -- dissipates in --

At column 5, line approx. 65, "cooling fluids flows", should read -- cooling fluid flows --

At column 6, line approx. 18, "FIG. 1.", should read -- FIG. 1 --

At column 7, line 1-2, "comprising different kind", should read -- comprises a different kind --

Signed and Sealed this
Twenty-ninth Day of November, 2011

David J. Kappos
*Director of the United States Patent and Trademark Office*

CERTIFICATE OF CORRECTION (continued)

At column 7, line approx. 4, "motherboards 14 is", should read -- motherboards 14 are --

At column 7, line 4-5, "resistors 13 is", should read -- resistors 13 are --

At column 7, line 23, "stops, it", should read -- stop, it --

At column 7, line approx. 61, "fluids where", should read -- fluids were --

At column 7, line 64, "circulates in", should read -- circulate in --

At column 8, line approx. 38, "in connection other", should read -- in connection with other --

At column 8, line approx. 44, "is dissipates into", should read -- dissipates into --

At column 9, line approx. 8, "be casted into", should read -- be cast into --

At column 9, line 18, "cast a floor", should read -- casting a floor --

At column 9, line approx. 37, "conduits 22 is", should read -- conduits 22 are --

At column 9, line approx. 44, "means 38 in integrated", should read -- means 38 are integrated --

At column 9, line approx. 50, "is also feasible", should read -- are also feasible --

At column 9, line approx. 63-64, "converter 7 comprise a", should read -- converter 7 comprises a --

At column 10, line 9, "acts as a", should read -- act as a --

At column 10, lines 12-13, "extend of the fluid conduits 22 are", should read -- extent of the fluid conduits 22 is --

At column 10, line approx. 41, "of a barges", should read -- of a barge --

At column 10, line approx. 48, "conduits 22 runs", should read -- conduits 22 run --

At column 10, line approx. 51, "FIG. 3 to 7 illustrates", should read -- FIGS. 3 to 7 illustrate --

At column 10, line approx. 53-54, "can off course", should read -- can of course --

At column 10, line approx. 64, "are required", should read -- is required --

CERTIFICATE OF CORRECTION (continued)
U.S. Pat. No. 7,963,740 B2

At column 11, line 2, "bolt are", should read -- bolts are --

At column 11, line approx. 14, "circuit 28 comprise", should read -- circuit 28 comprises --

At column 11, line approx. 20, "extends from", should read -- extend from --

At column 11, line approx. 23, "and the it returns", should read -- and it returns --

At column 11, line approx. 64, "sealed of from", should read -- sealed off from --

At column 12, line approx. 4, "FIG. 3 to 9", should read -- FIGS. 3 to 9 --

At column 12, lines approx. 9-10, "fraction to the", should read -- fraction of the --

At column 12, line approx. 23, "the two part", should read -- the two parts --

At column 12, line approx. 38, "cables does in", should read -- cables do in --

In the Claims:

At column 14, claim number 17, line 12, "fluids flows in", should read -- fluids flow in --